(12) United States Patent  (10) Patent No.: US 8,931,919 B2
Rami et al.  (45) Date of Patent: Jan. 13, 2015

(54) LIGHTING UNIT AND LUMINAIRE FOR ROAD AND/OR STREET LIGHTING

(75) Inventors: Jean-Paul Rami, Vernon (FR); Florian Rocard, Cergy le Haug (FR)

(73) Assignee: Thorn Europhane S.A., Les Andelys (FR)

( * ) Notice: Subject to any disclaimer, the term of this patent is extended or adjusted under 35 U.S.C. 154(b) by 367 days.

(21) Appl. No.: 13/203,849

(22) PCT Filed: Mar. 17, 2010

(86) PCT No.: PCT/EP2010/053466
§ 371 (c)(1),
(2), (4) Date: Sep. 29, 2011

(87) PCT Pub. No.: WO2010/106104
PCT Pub. Date: Sep. 23, 2010

(65) Prior Publication Data
US 2012/0014101 A1 Jan. 19, 2012

(51) Int. Cl.
*F21V 1/00* (2006.01)
*F21S 8/08* (2006.01)
*F21K 99/00* (2010.01)
*F21V 14/00* (2006.01)
*F21V 23/04* (2006.01)
*H05B 33/08* (2006.01)
*F21W 111/02* (2006.01)
(Continued)

(52) U.S. Cl.
CPC . *F21S 8/086* (2013.01); *F21K 9/00* (2013.01); *F21V 14/00* (2013.01); *F21V 23/0442* (2013.01); *H05B 33/0803* (2013.01); *H05B 33/0845* (2013.01); *F21W 2111/02* (2013.01); *F21W 2131/10* (2013.01); *F21W 2131/103* (2013.01); *F21Y 2101/02* (2013.01); *Y02B 20/72* (2013.01)
USPC ...................................... 362/240; 362/249.02

(58) Field of Classification Search
CPC .............. F21V 23/003; F21V 23/0457; F21V 23/0464; F21V 23/0471; F21K 9/00; F21W 2131/103; F21W 2131/20; F21W 2131/202; F21W 2131/205; F21S 6/006; F21S 8/085; F21S 8/086; F21S 8/088
USPC ............... 362/276, 236–238, 249.02, 249.06, 362/239, 240
See application file for complete search history.

(56) References Cited

U.S. PATENT DOCUMENTS 6,250,774 B1   6/2001 Begemann et al.
2003/0185009 A1*  10/2003 Walters ........................ 362/276
(Continued)

FOREIGN PATENT DOCUMENTS

DE            44 31 750 A1    3/1996
DE   20 2008 004 790 U1    8/2008
(Continued)

*Primary Examiner* — Julie Bannan
(74) *Attorney, Agent, or Firm* — Marshall, Gerstein & Borun LLP

(57) ABSTRACT

A lighting unit for use in a luminaire, in particular a luminaire for road and/or street lighting, has an adaptable light distribution wherein the lighting unit comprises at least two light sources or groups of light sources, each of the light sources or groups of light sources having an individual light distribution characteristic, wherein the overall light distribution of the lighting unit is adapted by modifying the ratio of the light outputs of the at least two light sources or groups of light sources

8 Claims, 4 Drawing Sheets

(51) Int. Cl.
*F21W 131/10* (2006.01)
*F21W 131/103* (2006.01)
*F21Y 101/02* (2006.01)

(56) References Cited

U.S. PATENT DOCUMENTS

2007/0273500 A1* 11/2007 Chiu .............................. 340/522
2008/0013314 A1* 1/2008 Ashdown et al. ............. 362/231
2008/0062689 A1 3/2008 Villard
2008/0212329 A1 9/2008 Duguay et al.
2010/0259191 A1* 10/2010 Ghanem et al. ............... 315/297

FOREIGN PATENT DOCUMENTS

| DE | 10 2007 061 160 A1 | 6/2009 |
| JP | 2008-210655 | 9/2008 |
| JP | 2008-258007 | 10/2008 |

* cited by examiner

LIGHTING UNIT AND LUMINAIRE FOR ROAD AND/OR STREET LIGHTING

BACKGROUND OF THE INVENTION

1. Field of the Invention

The present invention relates to a lighting unit and a luminaire to be used for street and/or road lighting. In particular, the present invention is directed to a lighting unit providing the possibility to adapt the light distribution in longitudinal direction of the road.

2. Related Technology

As it is customary with luminaires for street and/or road lighting in urban areas, known street lighting luminaires are mounted on a pole or on a wall front, with the plane of symmetry being directed perpendicular to the longitudinal direction of the street or road to be lit. The luminaire must then throw the generated light sideways from the plane of symmetry so as to evenly light parts of the street or road on the left and right of the luminaire. Further, a portion of the light is also irradiated along the plane of symmetry so as to also illuminate the whole width of the street or road in front of the luminaire.

When developing a luminaire for street lighting, different needs have to be addressed. At first, a fast and efficient installation of the luminaires is desirable. Further, a high utilization factor and efficiency is needed while at the same time the glare rating should be kept as low as possible. As in all lighting applications, a good visibility level should be obtained and the contribution to sky glow should be minimized.

From the prior art, different solutions for road lighting luminaires are known which can generally be divided into two main families.

Conventional road lighting luminaires are usually equipped with one lamp and a corresponding reflector system wherein the reflector system is designed to influence the light in such a way that a desired light distribution is obtained.

Further, road lighting luminaires are known which comprise a plurality of light emitting devices, in particular LEDs. In this case, the LEDs are arranged in a very specific pattern wherein each LED emits its light into a specific direction. In both cases, the known luminaires are regularly spaced on one side or both sides of the road.

The conventional luminaires mentioned above in most cases comprise a high-pressure sodium discharge lamp or a metal halide discharge lamp for which the emitted light of the burner is controlled by a reflector to obtain the desired street lighting. It is known to adapt the light distribution to different desired lighting schemes (i.e., a specific distance between the luminaires or a specific width of the read) by changing the position of the lamp with respect to the reflector. However, the range in which the light distribution can be adapted in this way is limited and also the utilization factor of such conventional luminaires is limited to a value of 0.45 to 0.5. In order to obtain a significant change in the light distribution characteristic of these luminaires, it would be necessary to change the reflector or use additional optical elements which influence the emitted light.

With respect to the second main family wherein a luminaire is based on a plurality of light emitting devices, different approaches have been proposed. According to a first solution, several light sources with different tilts and orientations are provided to obtain a combined light distribution suitable for road lighting. However, this approach tends to increase the complexity of the system and a limitation of glare is difficult to obtain. In another approach, all the light sources are arranged on the same planar surface and the lighting head of the luminaire is tilted by a relatively high angle (approximately 20° to 30°) in order to obtain an asymmetrical lateral light distribution which is required to illuminate also the opposite side of the road.

SUMMARY OF THE INVENTION

However, all solutions known from the prior art suffer from the drawback that it is very complicated and difficult to adapt the light distribution characteristics of the luminaire. A significant change of the light distribution can only be obtained by changing the arrangement of the light sources or using a plurality of different optical elements.

The present invention in particular deals with the problem of adapting the light distribution in the longitudinal direction of the road or street. The light distribution characteristic of the luminaires arranged on the side of a road has to be adapted in such a way that a uniform illumination is obtained over the whole length of the road. It is therefore necessary to ensure that a portion of the light is emitted to both sides of the luminaire within a specific range. The light distribution characteristic must take into account not only the height of the street lighting luminaires but also the distance between two adjacent luminaires, road characteristics (e.g., width of the road) and lighting standards which have to be fulfilled. During the design of a street lighting system, specific optics are selected which are later used when assembling the luminaires which optics provide the desired light distribution. In such a case it is thus necessary to provide different combinations of reflectors and/or lenses in order to ensure that an even illumination of the road can be obtained. Obviously, this solution is complicated and requires the storage of a plurality of different optical components.

Further, even after the final installation of the street lighting system situations can occur were an adaptation of the light distribution is desired. For example, if the weather conditions or road reflectivity change, it would be desirable to influence the light distribution in order to obtain better luminances. With the conventional system known from the prior art mentioned above, such an adaptation of the light distribution during the operation of the system is practically not possible.

As explained above, other solutions are known in the prior art wherein a street lighting luminaire comprises a plurality of individual light sources, in particular LEDs, wherein said LEDs are directed into specific directions in order to individually illuminate a certain area around the luminaire. The overall light distribution of the luminaire can in such a case be amended by selecting only a portion of the LEDs which are active. However, this solution requires a complicated control system and shows a low efficiency since only a fraction of the available light sources is actually used.

The present invention therefore aims to provide a new solution which allows a fast and efficient adaptation of the light distribution of a street lighting luminaire.

Accordingly, the invention provides a lighting unit for use in a luminaire, in particular a luminaire for road and/or street lighting, the lighting unit having an adaptable light distribution, wherein the lighting unit comprises at least two light sources or groups of light sources, each of the light sources or groups of light sources having an individual light distribution characteristic, and wherein the overall light distribution of the lighting unit is adapted by modifying the ratio of the light outputs of the at least two light sources or groups of light sources.

The inventive solution is based on the idea of providing a lighting unit having at least two light sources or groups of light sources wherein each of said light sources or groups of light sources has an individual light distribution characteristic. The overall light distribution is then adapted by modifying the ratio of the light outputs of the light sources or groups of light sources in such a way that the mixed light emitted by both light sources/groups of light sources combines to the desired distribution.

Accordingly, a lighting unit for use in a luminaire, in particular a luminaire for road and/or street lighting is provided wherein said lighting unit has an adaptable light distribution. The lighting unit comprises at least two light sources or groups of light sources, each of said light sources or groups of light sources having an individual light distribution characteristic wherein the overall light distribution of the lighting unit is adapted by modifying the ratio of the light outputs of the at least two light sources or groups of light sources.

According to a further aspect of the present invention, a method for adapting the light distribution of a luminaire, in particular for a luminaire used for road and/or street lighting is provided wherein the luminaire comprises at least two light sources or groups of light sources, each of said light sources or groups of light sources having an individual light distribution characteristic and wherein the overall light distribution of the luminaire is adapted by modifying the ratio of the light outputs of the at least two light sources or groups of light sources.

A significant advantage of the present invention is that the inventive solution also allows adapting the light distribution during the operation of the system. In case the weather and/or road reflectivity change, an adaptation of the distribution can immediately take place. Preferably, the adaptation of the light distribution is automatically carried out by a control unit integrated in the luminaire which either receives external control signals or is connected to a sensor providing information on the road and/or weather conditions.

The present invention also allows that all light sources are arranged on a flat surface. Thus, the geometry of the luminaire and the manufacturability thereof is simplified.

Preferably, LEDs are used as light sources. In this case, each group of light sources comprises a plurality of LEDs and the ratio of the light outputs of the groups of light sources could be modified by selecting the total number of activated LEDs in each group. More preferably, the change of the ratio of the light outputs and thus of the light distribution is obtained by changing the forward current supplied to the LEDs or and PWM signal used to drive the LEDs. Each light source or group of light sources can be provided with an optical element being adapted to distribute the light of the corresponding light source or group of light sources in accordance with the individual light distribution. In particular, it would be sufficient to provide two light sources wherein the first one has a light distribution to lit the section of the road or street below the luminaire and the second one is adapted to direct the light to sections of the road or street far away from the luminaire. The light of these two light sources can then be combined to the desired overall light distribution.

BRIEF DESCRIPTION OF THE DRAWINGS

In the following, the present invention and preferred embodiments thereof are explained in more detail with respect to the enclosed drawings. In these drawings:

FIGS. 1 and 2 schematically show the situation where street lighting luminaires 100 are arranged at a regular interval on the side of a road. In the present case, the luminaires 100 are separated by a distance of 30 m and therefore a specific light output distribution in the longitudinal direction of the road, i.e., in $C_0$-$C_{180}$ plane, is required as shown on the right hand side of FIG. 1.

Figure 1:
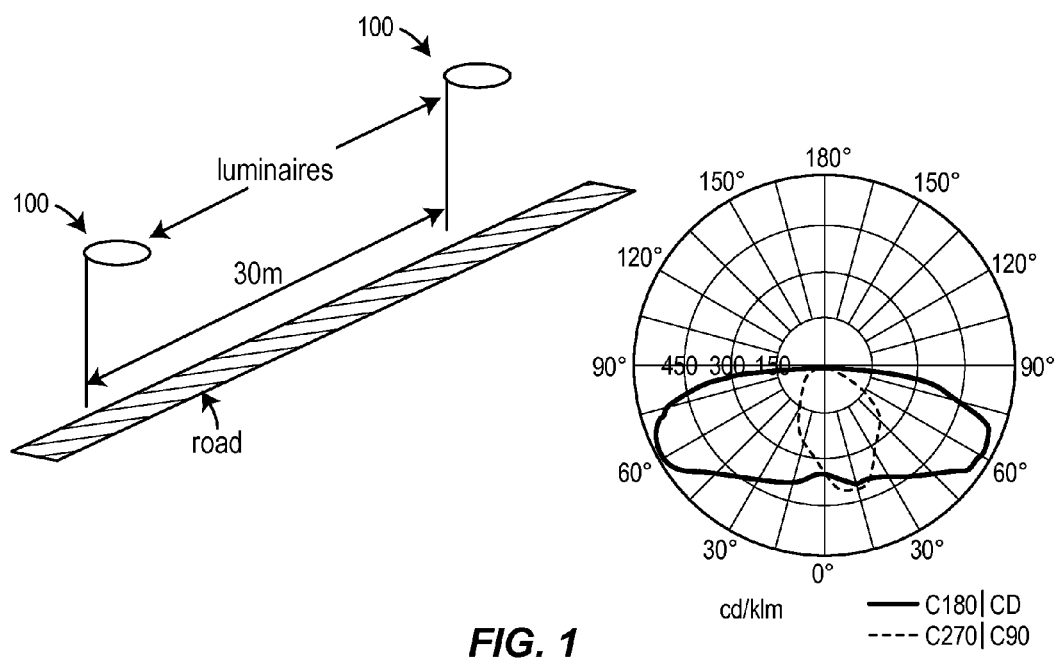
FIGS. 1 and 2 schematically show the problem underlying the present invention.
Figure 2:
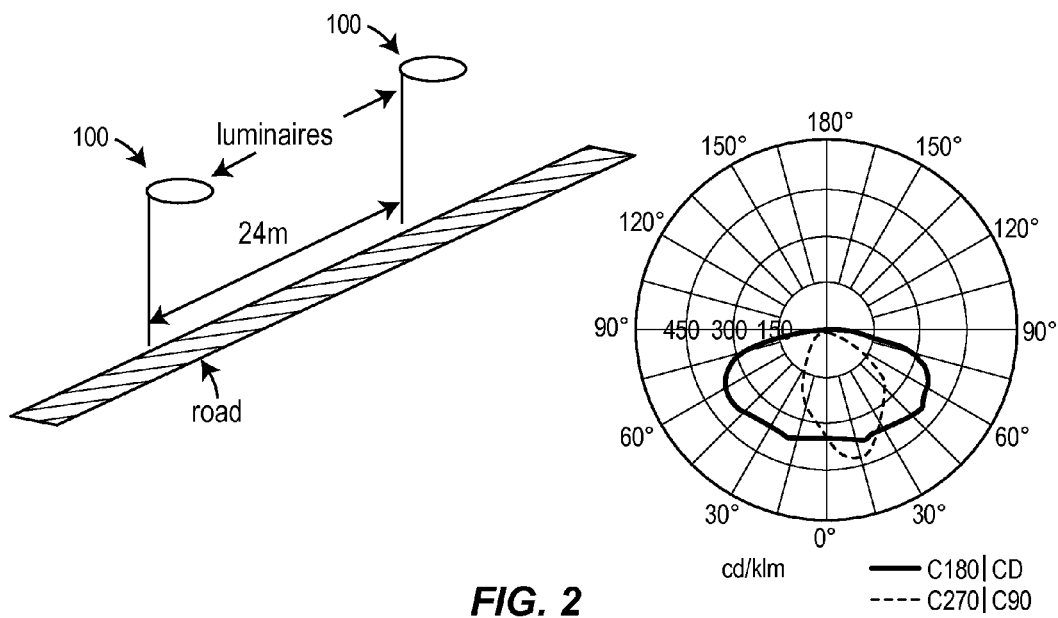

If now the distance between two luminaires 100 is reduced as shown in FIG. 2, also the light distribution has to be adapted to form a more narrow light distribution as shown in FIG. 2 in order to ensure again a uniform luminance of the road over the whole length. If in this case luminaires would be used with a light distribution as shown in FIG. 1, fluctuations in the luminance over the length of the road would result in a bad visibility of obstacles for drivers driving along the road.

Although this situation is not shown in the figures, also an adaptation of the light distribution would be required in case the height of the luminaires is amended during lighting design. Further, also situations during the operation of the street lighting system may occur where an adaptation of the light distribution is desired. In particular, if weather conditions change (rain, fog, . . . ) a slight adaptation of the light output could improve the quality of the illumination and better luminance repartition on the road. Also changing road conditions due to rain, snow or other effects (for example aging or replacement of asphalt or renewing of the road surface) might require an adaptation of the light output.

DETAILED DESCRIPTION

The present invention now provides a very efficient and elegant solution to solve the above-mentioned problems. The solution is based on the idea of providing a lighting unit having two different light sources with different light distribution characteristics wherein the intensity of the light sources is amended in such a way that an overall light distribution is obtained which corresponds to the desired distribution.

Figure 3:
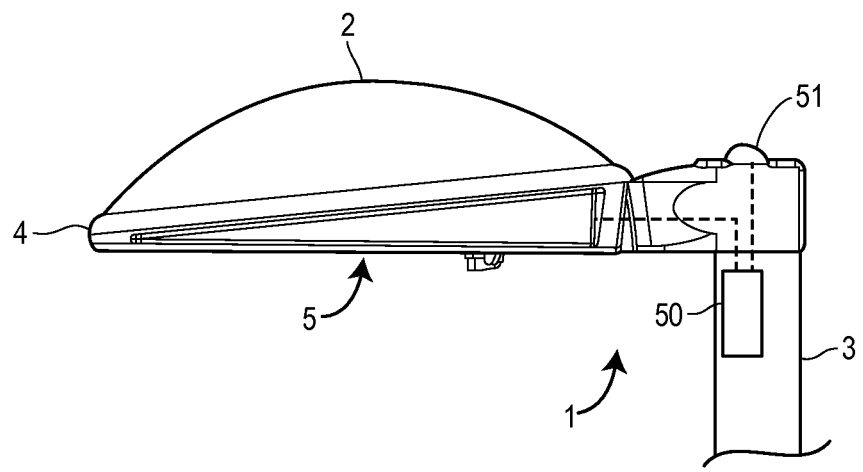
FIGS. 3 and 4 show views of an embodiment of a street lighting luminaire in accordance with the present invention.
Figure 4:
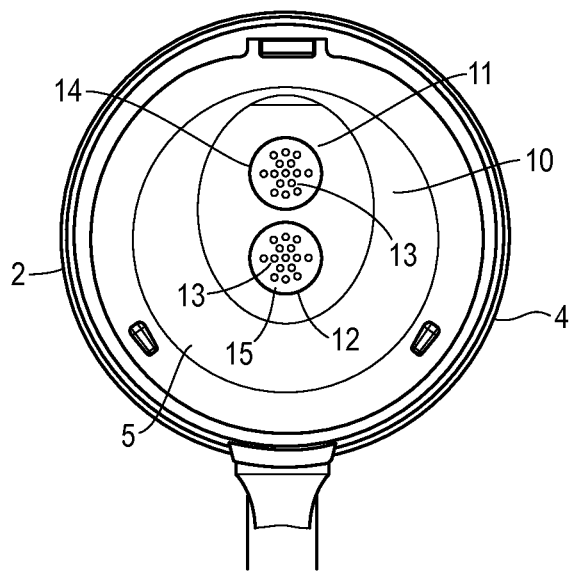

FIGS. 3 and 4 show an embodiment of a street lighting luminaire which comprises a lighting unit capable of adapting the distribution as explained above. As shown in FIGS. 3 and 4, the luminaire 1 comprises a lighting head 2 arranged on the top of a post 3. Alternatively, it would also be possible to mount the lighting head 2 directly on a vertical wall. Preferably, the lighting head 2 extends horizontally. It would, however, also be possible to use an inclined arrangement wherein the head 2 is arranged at an acute angle of around 0° to 15° with respect to the horizontal.

In the present embodiment shown in the figures, the lighting head comprises a circular housing 4 accommodating an inventive lighting unit 10 which will be explained in more detail below. However, also other shapes for the lighting head 2 could be used. The bottom opening of the housing 4 is covered by a transparent plate 5 in order to avoid the entrance of dust or humidity into the interior of the lighting head 2.

FIG. 4 shows in more detail the lighting head 2 of the luminaire 1 including the inventive lighting 10. The lighting unit 10 comprises in the shown embodiment two light sources 11 and 12 wherein each light source 11, 12 comprises a plurality of LEDs 13. Each light source further comprises a lens 14, 15 which controls the emission of the light emitted by the corresponding group of LEDs 13. The lenses 14, 15 at first provide a light distribution with a lateral asymmetry—preferably with the same lateral asymmetry—in order to ensure that a road in front of the luminaire can be illuminated with a high intensity while at the same time the two sideways are also illuminated with a lower intensity.

The lenses 14, 15 have, however, also different longitudinal distributions wherein the lens 14 of the first light source 11 is adapted to direct the light emitted by the corresponding LEDs 13 right under the luminaire 1. The first light source 11 therefore has a light distribution to light the section of the road or street below the luminaire. On the other hand, the lens 15 of the second light source 12 is adapted to distribute the light mainly to the side, i.e. in the longitudinal direction of the road and thus the second light source 12 has a light distribution with a different longitudinal distribution.

While in the present embodiment each light source 11, 12 has a single lens 14, 15 covering all LEDs 13 of the corresponding light source 11, 12, it would also be possible that each single LED 13 has its own optical element. In this case, all LEDs 13 with an optical element providing a narrow longitudinal light distribution form the first light source while the LEDs 13 with optical elements providing a wide longitudinal light distribution represent the second light source. Further, also reflectors could be used to provide light sources with different light emitting characteristics in longitudinal direction.

Figure 5A:
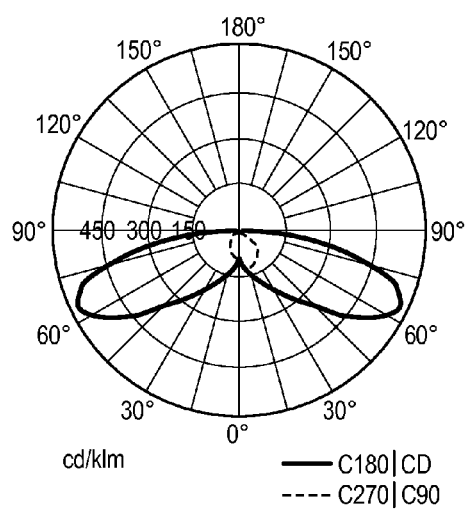
FIGS. 5a and 5b show light distributions for two different light sources.
Figure 5B:
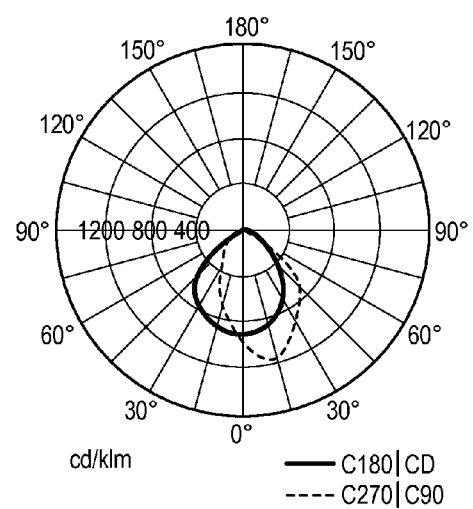

FIGS. 5a and 5b show as an example light distributions for two different light sources. It can be easily seen from the drawings that FIG. 5a represents the distribution of a light source adapted to emit the light to the side wherein FIG. 5b shows the distribution for a light source being adapted to direct the light to the area below the luminaire.

During the operation of the luminaire, both types of light sources will be activated. However, depending on the ratio of the intensities of both light sources, a different overall light distribution is obtained in longitudinal direction. This can be seen from FIGS. 6a to 6c which show combined light distributions for three different ratios wherein starting from FIG. 6a the portion of the light source of FIG. 5a is gradually decreased while at the same time the intensity of the light source of FIG. 5b is increased. As shown in the figures, this changing of the ratio results in a more narrow overall light distribution in longitudinal direction while the light distribution in lateral direction does not significantly change. In the present embodiment where LEDs 13 are used as light sources, the ratio of intensities of the two LED groups can easily be changed by simply adjusting the numbers of activated LEDs 13 in each group.

Alternatively, also the forward current provided to the LEDs 13 of the two different light sources 11, 12 could be changed in order to adapt the overall longitudinal light distribution of the lighting unit 10. For example, all LEDs 13 could be driven at 350 mA for a specific first light distribution wherein a second light distribution is obtained by driving the LEDs at 200 mA and 500 mA, respectively. Further, it is well known that dimming of LEDs can be achieved by driving the LEDs with a pulse width modulated current and changing the duty cycle. Controlling the duty cycles both lights sources can thus also be used to adapt the overall longitudinal light distribution. Finally, a preset could be made during the manufactory of the lighting unit in order to choose optics providing the desired quantity of light to obtain finally the desired light distribution. Of course, in this case an adaptation of the light distribution during the operation of the luminaire is not possible.

Preferably, the intensities of both light sources are changed in such a way that the total power consumption of the luminaire is maintained. For example, the total number of activated LEDs could be kept constant.

Figure 6A:
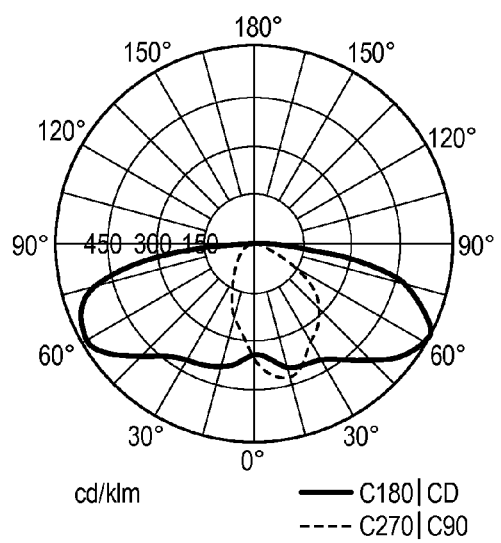
FIGS. 6a to 6c show the effect of amending the ratio of the light output of the two light sources of figures 5a and 5b.
Figure 6B:
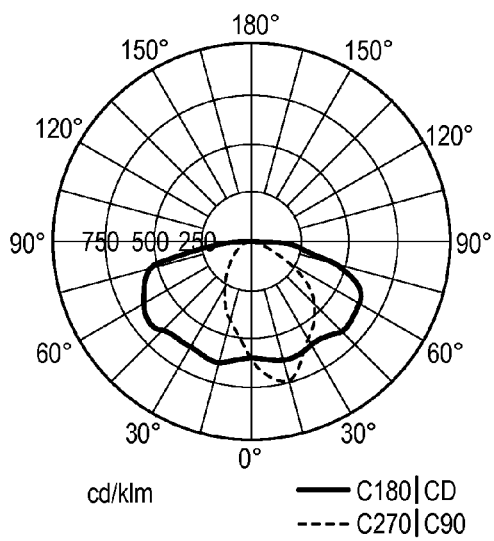
Figure 6C:
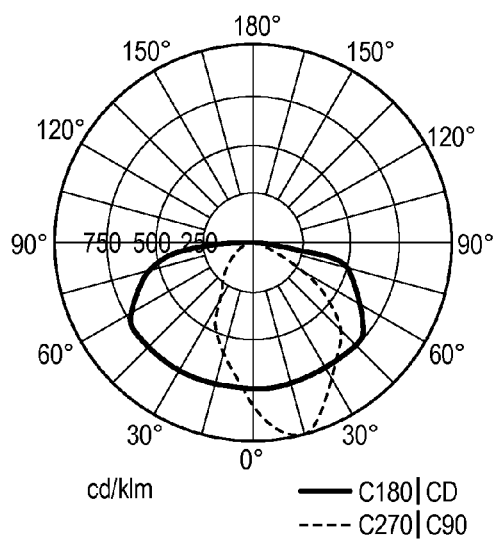

It clearly follows from FIGS. 6a to 6c that the inventive solution is suitable to adapt the light distribution of the luminaire depending on the present situation. In particular, a specific ratio could be chosen when the luminaires are installed without the necessity to provide different optical elements depending on the arrangement of the luminaires or the dimensions of the road.

While the embodiment shown in the figures comprises only two different light sources or groups of light sources, it is obvious that the number of light sources could also be increased. However, an efficient adaptation of the light distribution can already be obtained in case only two different light sources are used.

Furthermore, it would also be possible to adapt the light distribution during the operation of the system. This might become necessary in case the weather or road conditions change. Preferably, the luminaire is adapted to automatically adapt the light distribution in case such a situation occurs. The luminaire 1 therefore comprises a control unit 50 (schematically shown in FIG. 3) controlling the ratio of the intensities of the different light sources. Said control unit 50 is—for example—connected to a sensor 51 providing information on the present meteorological situation. This sensor 51 could for example be a rain sensor or the like. Alternatively, it would also be possible that the luminaires 1 are somehow connected to a central control station which provides external control signals causing the luminaires to adapt the light distribution.

In summary, the present invention provides a solution which allows adapting the light distribution of a luminaire in an efficient and elegant way. In particular, it is also possible to take influence on the light distribution characteristics during the operation of the system.

The invention claimed is:

1. Lighting unit for use in a luminaire, said lighting unit having an overall adaptable light distribution, wherein:
    said lighting unit includes first and second light sources arranged on the same plane, each light source comprising a plurality of selectively activatable LEDs, the first light source being assigned to a first optical element, the second light source being assigned to a second optical element, and the first optical element being adapted to provide a narrow longitudinal light distribution relative to a wide longitudinal light distribution of the second optical element; and
    the overall light distribution of the lighting unit is adaptable by modifying a ratio of active LEDs to inactive LEDs in each of the first and second light sources, wherein a total number of active LEDs within the lighting unit is kept constant, to obtain an overall light distribution which corresponds to a desired overall light distribution.

2. Lighting unit according to claim 1, said lighting unit comprising a control unit to control the overall light distribution.

3. Lighting unit according to claim 2, wherein said control unit is adapted to control the overall light distribution in accordance with weather and/or road conditions.

4. Lighting unit according to claim 2, wherein said control unit is adapted to control the overall light distribution on the basis of external control signals.

5. Luminaire for road and/or street lighting, said luminaire having a lighting unit according to claim 1.

6. Method for adapting the light distribution of a luminaire, wherein the luminaire includes first and second light sources arranged on a same plane, each light source comprising a plurality of selectively activatable LEDs, the first light source being assigned to a first optical element, the second light source being assigned to a second optical element, the first optical element being adapted to provide a narrow longitudinal light distribution relative to a wide longitudinal distribution of the second optical element, the method comprising:

adapting an overall light distribution of the luminaire by modifying a ratio of active LEDs to inactive LEDs in each of the first and second light sources, wherein a total number of active LEDs within the luminaire is kept constant, to obtain an overall light distribution which corresponds to a desired light distribution.

7. Method according to claim 6, comprising adapting the overall light distribution in accordance with weather conditions and/or road conditions.

8. Method according to claim 6, comprising modifying the ratio of the light outputs of the two light sources in such a way that the total power consumption of the luminaire is constant.

* * * * *